US010827055B2

United States Patent
Ye et al.

(10) Patent No.: US 10,827,055 B2
(45) Date of Patent: Nov. 3, 2020

(54) METHOD FOR OBTAINING EVENT INFORMATION ON MOBILE TERMINAL AND MOBILE TERMINAL

(71) Applicant: Huawei Technologies Co., Ltd., Shenzhen (CN)

(72) Inventors: Min Ye, Shenzhen (CN); Jingyu Zhang, Shenzhen (CN); Jian Chen, Hangzhou (CN); Tizheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/456,951

(22) Filed: Jun. 28, 2019

(65) Prior Publication Data

US 2019/0327356 A1 Oct. 24, 2019

Related U.S. Application Data

(63) Continuation of application No. PCT/CN2017/099424, filed on Aug. 29, 2017.

(30) Foreign Application Priority Data

Dec. 30, 2016 (CN) .......................... 2016 1 1260769

(51) Int. Cl.
*H04M 1/725* (2006.01)
*H04W 4/20* (2018.01)
(Continued)

(52) U.S. Cl.
CPC ......... *H04M 1/72522* (2013.01); *H04W 4/20* (2013.01); *G06F 3/0482* (2013.01); *G06F 3/04817* (2013.01)

(58) Field of Classification Search
CPC ......... H04M 1/72522; H04M 1/72552; H04M 1/274558; H04M 1/72566;
(Continued)

(56) References Cited

U.S. PATENT DOCUMENTS

2004/0196866 A1\* 10/2004 Park .................. H04L 29/06027
370/466
2007/0271293 A1 11/2007 Peng
(Continued)

FOREIGN PATENT DOCUMENTS

CN 103221948 A 7/2013
CN 103325031 A 9/2013
(Continued)

*Primary Examiner* — George Eng
*Assistant Examiner* — Umair Ahsan
(74) *Attorney, Agent, or Firm* — Leydig, Voit & Mayer, Ltd.

(57) ABSTRACT

This application provides a mobile terminal and a method for obtaining event information on a mobile terminal, so as to automatically add a plurality of pieces of classifiable information in an event notification message to an application, thereby improving addition efficiency. The method includes: receiving, by a mobile terminal, an event notification message of a first application; obtaining, by the mobile terminal, n pieces of classifiable information in the event notification message based on a predefined class template; determining, by the mobile terminal, a second application based on the n class attributes according to a preset rule; and adding, by the mobile terminal, m pieces of classifiable information that are in the event notification message to the m class attributes in the second application.

5 Claims, 12 Drawing Sheets

(51) Int. Cl.
*G06F 3/0481* (2013.01)
*G06F 3/0482* (2013.01)

(58) Field of Classification Search
CPC ......... H04M 1/72583; H04M 1/72597; H04W 4/20; H04W 88/02; G06F 3/0482; G06F 16/24575; G06F 17/2785; G06F 9/542; H04L 67/2819
See application file for complete search history.

(56) References Cited

U.S. PATENT DOCUMENTS

| | | | |
|---|---|---|---|
| 2009/0068990 A1* | 3/2009 | Kim | G06F 10/109 |
| | | | 455/412.1 |
| 2012/0226753 A1* | 9/2012 | Cheng | H04M 1/72547 |
| | | | 709/204 |
| 2012/0289206 A1* | 11/2012 | Shim | G06Q 10/06 |
| | | | 455/414.1 |
| 2013/0145024 A1 | 6/2013 | Cao et al. | |
| 2015/0304425 A1* | 10/2015 | Park-Ekecs | H04L 67/125 |
| | | | 715/740 |
| 2017/0126609 A1* | 5/2017 | Sharifi | H04L 51/24 |

FOREIGN PATENT DOCUMENTS

| | | | |
|---|---|---|---|
| CN | 104750357 A | 7/2015 | |
| CN | 104980549 A | 10/2015 | |
| CN | 105657158 | * 12/2015 | ...... H04M 1/274533 |
| CN | 105227572 A | 1/2016 | |
| CN | 105657158 A | 6/2016 | |
| CN | 105898721 A | 8/2016 | |
| CN | 106686240 A | 5/2017 | |
| EP | 1965594 A1 | 9/2008 | |
| JP | 2007317190 A | 12/2007 | |
| WO | 2009030769 A2 | 3/2009 | |

* cited by examiner

METHOD FOR OBTAINING EVENT INFORMATION ON MOBILE TERMINAL AND MOBILE TERMINAL

CROSS-REFERENCE TO RELATED APPLICATIONS

This application is a continuation of International Application No. PCT/CN2017/099424, filed on Aug. 29, 2017, which claims priority to Chinese Patent Application No. 201611260769.2, filed on Dec. 30, 2016. The disclosures of the aforementioned applications are hereby incorporated by reference in their entireties.

TECHNICAL FIELD

Embodiments of this application relate to the field of information processing on a mobile terminal, and more specifically, to a method for obtaining event information on a mobile terminal and a mobile terminal.

BACKGROUND

Content recognition by a mobile terminal mainly includes automatic matching and feature capturing performed by the mobile terminal on information such as a character, a picture, and a geographic location. Character recognition may be applied to a plurality of fields such as reading, translation, document retrieval, letter and parcel sorting, manuscript editing and proofreading, summarization and analysis of massive statistical statements and cards, bank check processing, commodity invoice summarization, commodity code recognition, commodity warehouse management, automatic processing of massive credit cards in services of charging fees for water, electricity, gas, house rent, and personal insurance, and partial work automation for office typists. Character information recognition in a mobile terminal system can support the mobile terminal system in performing a further intelligent scenario function after obtaining and recognizing character information. For example, after obtaining and recognizing address content, the mobile terminal system may invoke a related map application in the system based on a shortcut operation performed by a user on the address content, to recommend content related to the address text content to the user, so that the user can check and select the content recommended by the mobile terminal and the like.

In the prior art, an event notification message received by a mobile terminal may include a plurality of pieces of information, and if a user needs to add the plurality of pieces of information to an application, the user needs to respectively perform operations such as manual addition or system recognition addition. For example, after an SMS application module receives a notification message that includes content such as a position, a contact, an email address, and a phone number, when the user needs to add the contact, the email address, and the phone number to an address book, the user first performs a shortcut operation on the phone number to add the phone number to the address book, and then successively manually enters or copies the contact and the email address in the SMS message to a contact and email address column in the address book. It can be learned that such a method for adding a plurality of pieces of classifiable information in one event notification message to an application one by one causes relatively low efficiency.

SUMMARY

This application provides a method for obtaining event information on a mobile terminal and a mobile terminal, so as to automatically add a plurality of pieces of classifiable information in an event notification message to an application, thereby improving addition efficiency.

According to a first aspect, a method for obtaining event information on a mobile terminal is provided, and includes: receiving, by a mobile terminal, an event notification message of a first application;

obtaining, by the mobile terminal, n pieces of classifiable information in the event notification message based on a predefined class template, where the n pieces of classifiable information are respectively corresponding to n class attributes, the class template includes a classification relationship between classifiable information and a class attribute, and n is an integer greater than or equal to 2;

determining, by the mobile terminal, a second application based on the n class attributes according to a preset rule, where the second application includes m class attributes, a set that includes the m class attributes is a subset of a set that includes the n class attributes, and m is an integer greater than or equal to 2 and not greater than n; and adding, by the mobile terminal, m pieces of classifiable information that are in the event notification message and that are respectively corresponding to the m class attributes to the m class attributes in the second application.

According to the method for obtaining event information on a mobile terminal in this application, the mobile terminal may obtain the plurality of pieces of classifiable information included in the event notification message by using the predefined class template. In addition, the mobile terminal may obtain, according to the preset rule, an application (namely, the second application) that includes class attributes corresponding to at least two pieces of classifiable information in the plurality of pieces of classifiable information. Further, the mobile terminal may automatically add the at least two pieces of classifiable information in the plurality of pieces of classifiable information to the corresponding class attributes in the second application. Therefore, operation complexity of adding all pieces of classifiable information by a user one by one can be reduced, information addition efficiency can be improved, and user experience can be improved.

In a possible implementation, the determining, by the mobile terminal, a second application based on the n class attributes according to a preset rule includes:

determining, by the mobile terminal, a target application based on the n class attributes, where the target application includes at least one class attribute in the n class attributes; and if there are a plurality of target applications, determining, by the mobile terminal from the target applications, an application that includes most attributes in the n class attributes, to serve as the second application.

In a possible implementation, the determining, by the mobile terminal, a second application based on the n class attributes according to a preset rule includes:

determining, by the mobile terminal, a target application based on the n class attributes, where the target application includes at least one class attribute in the n class attributes; and if there are a plurality of target applications, determining, by the mobile terminal from the target applications, an application that has highest relevance to the first application, to serve as the second application.

In the foregoing manner, the mobile terminal may automatically add the classifiable information in the event notification message to the application having highest relevance to the first application.

In a possible implementation, the determining, by the mobile terminal, a second application based on the n class attributes according to a preset rule includes:

determining, by the mobile terminal, a target application based on the n class attributes, where the target application includes at least one class attribute in the n class attributes; and if there are a plurality of target applications, determining, by the mobile terminal from the target applications, an application used by a user at a time that is proximate to a time at which the first application is used, to serve as the second application.

In a possible implementation, the determining, by the mobile terminal, a second application based on the n class attributes according to a preset rule includes:

determining, by the mobile terminal, a target application based on the n class attributes, where the target application includes at least one class attribute in the n class attributes; and if there are a plurality of target applications, determining, by the mobile terminal from the target applications, an application that is most frequently used by a user, to serve as the second application.

In a possible implementation, the determining, by the mobile terminal, a second application based on the n class attributes according to a preset rule includes:

determining, by the mobile terminal, a target application based on the n class attributes, where the target application includes at least one class attribute in the n class attributes; and if there are a plurality of target applications, determining, by the mobile terminal, an application that is randomly selected from the target applications, to serve as the second application.

In a possible implementation, the determining, by the mobile terminal, a second application based on the n class attributes according to a preset rule includes:

determining, by the mobile terminal, a target application based on the n class attributes, where the target application includes at least one class attribute in the n class attributes; and if there is one target application, determining, by the mobile terminal, the target application as the second application.

In a possible implementation, the determining, by the mobile terminal, a second application based on the n class attributes according to a preset rule includes:

determining, by the mobile terminal, a target application based on the n class attributes, where the target application includes at least one class attribute in the n class attributes; and if there are a plurality of target applications, determining, by the mobile terminal, any one of the target applications as the second application.

Optionally, the mobile terminal may determine some or all of the target applications as second applications.

If there are a plurality of second applications, the mobile terminal may sequentially present application names of the determined second applications to the user based on a quantity of included class attributes in the n class attributes. In addition, the mobile terminal may alternatively sequentially present application names of the determined second applications to the user based on relevance to the first application. Moreover, the mobile terminal may alternatively sequentially present application names of the determined second applications to the user based on an interval between a use time of the user and a current time, or a use frequency of the user in a recent period of time. Certainly, the mobile terminal may randomly sort the second applications to present application names of the second applications to the user.

The user may select any one of the foregoing second applications, and add one or more pieces of classifiable information in the n pieces of classifiable information to a corresponding class attribute in the selected application. The user may select no application from the presented second applications, but add one or more pieces of classifiable information in the n pieces of classifiable information to a corresponding class attribute in each second application together.

It should be understood that for the foregoing plurality of manners of determining the second application by the mobile terminal, the mobile terminal may select one thereof or perform combination, and a specific manner that is to be used may be defined or selected by the user, so as to meet different user requirements.

In a possible implementation, before the adding, by the mobile terminal, m pieces of classifiable information in the event notification message to the m class attributes in the second application, the method further includes:

searching, by the mobile terminal, existing content corresponding to the m class attributes in the second application for content that is the same as the m pieces of classifiable information; and performing, by the mobile terminal, first processing on the same content based on an operation performed by the user on the same information content, where the first processing includes deletion processing.

The deletion processing is performed on the content, in the second application, that is the same as the m pieces of classifiable information, so as to avoid repeated information storage, and release storage space of the mobile terminal. In addition, it is convenient for the user to read and search for related content, so as to improve user experience.

According to a second aspect, a mobile terminal is provided, and is configured to perform the method in the first aspect or any possible implementation of the first aspect. Specifically, the mobile terminal includes units configured to perform the method in the first aspect or any possible implementation of the first aspect.

According to a third aspect, a mobile terminal is provided, and includes a processor, a memory, and a transceiver, where the processor, the memory, and the transceiver are connected by using a bus system. The memory is configured to store an instruction, and the processor is configured to invoke the instruction stored in the memory, so that the terminal device performs the method in the first aspect or any possible implementation of the first aspect.

According to a fourth aspect, a computer readable medium is provided, and is configured to store a computer program, where the computer program includes an instruction used to perform the method in the first aspect or any possible implementation of the first aspect.

DESCRIPTION OF EMBODIMENTS

The following describes the embodiments of this application with reference to accompanying drawings.

In this application, the term such as "for example" is used to indicate an example, instance, or illustration. Any embodiment or design scheme described by using the term "for example" in the embodiments of this application should not be construed as having more advantages than another embodiment or design scheme. Exactly, using the term such as "for example" is intended to present a related concept in a specific manner.

A terminal device in this application includes an electronic product that can perform human-computer interaction with a user by using a keyboard, a touchpad, or a sound control device. For example, the terminal device may be a computer, a smartphone, a wearable device, a tablet computer (Portable Android Device (PAD)), or the like. An operating system running on the terminal device may be a Linux kernel-based operating system such as Android in a mobile version, Ubuntu in a mobile version, or Tizen, and a desktop operating system such as Windows, Mac OS, or Linux. This is not limited in this application.

In the embodiments of this application, an application may be referred to as an application program (e.g., Application or APP), and an application may be an application built into the operating system of the terminal device, or may be a third-party application installed in the operating system of the terminal device. This is not limited in this application.

Figure 1:
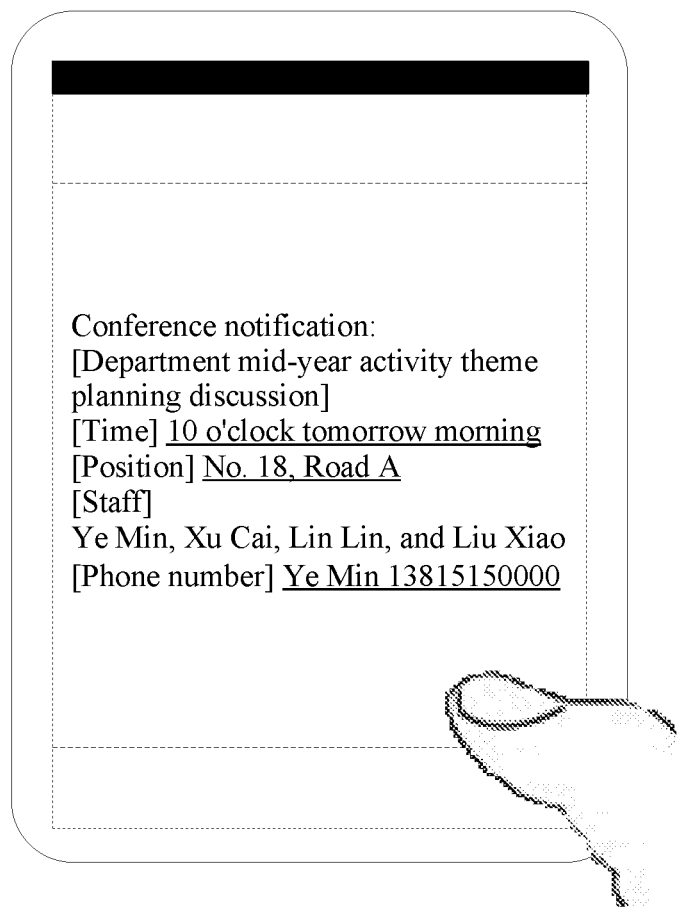
FIG. 1 is a schematic diagram of an application scenario according to this application.

FIG. 1 shows an application scenario according to embodiments of this application. As shown in FIG. 1, when an application of the terminal device, such as an SMS message or the WeChat® APP, receives an event notification message, and the event notification message includes two or more pieces of classifiable information such as a conference theme, a time, a position, staff, and a phone number, the terminal device may process the classifiable information by identifying an operation performed by a user on the classifiable information, for example, may enable an application related to the classifiable information.

In an existing related technology, a mobile system end usually performs tappable single recognition on key text content through tapping or touching and holding. The tapping triggers a most frequently-used operation action, and the touching and holding adds more operations on the text information. For example, when a current prompt is that digits may be tapped, the tapping is triggering a user to perform a call operation, and the touching and holding is triggering more operation options that include making a call, sending an SMS message, adding to an address book, copying, and the like. When the user needs to add the conference theme, the time, the position, the staff, and the phone number shown in FIG. 1 to an application such as a calendar, the user needs to perform operations on the conference theme, the time, the position, the staff, and the phone number one by one, to respectively add the conference theme, the time, the position, the staff, and the phone number to corresponding class attributes of the calendar. Such a method for adding a plurality of pieces of classifiable information to corresponding class attributes of an application one by one causes relatively low efficiency and relatively complex operations.

Based on the foregoing prior-art problems, this application provides a method for obtaining event information on a mobile terminal. When an event notification message includes a plurality of pieces of classifiable information, at least two pieces of classifiable information in the plurality of pieces of classifiable information can be automatically added to a corresponding application, and do not need to be manually added by a user, so as to improve addition efficiency, reduce addition operation complexity, and improve user experience.

Figure 2:
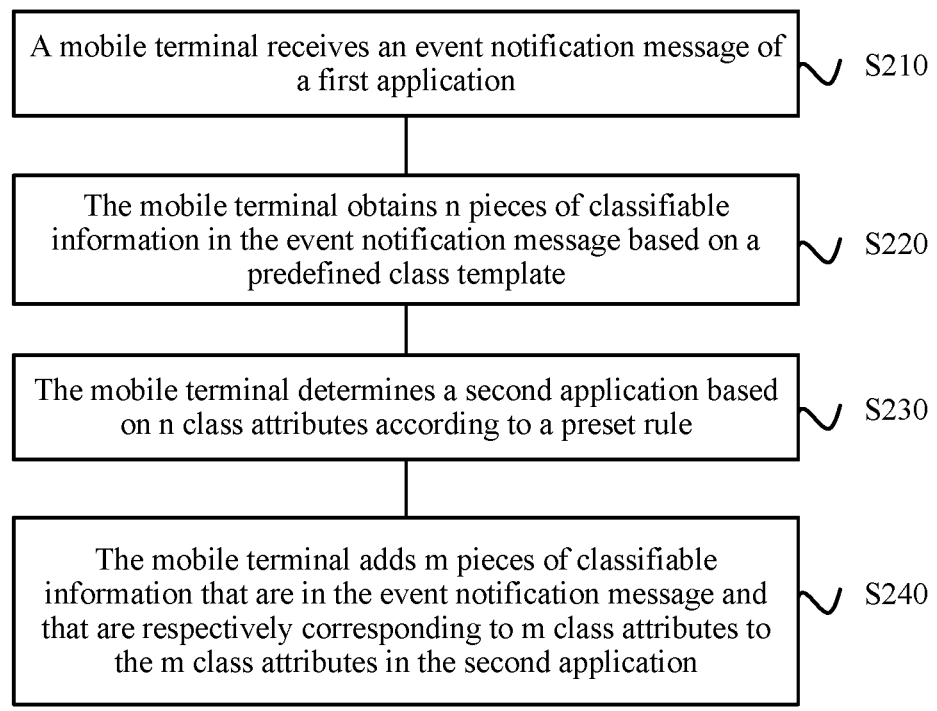
FIG. 2 is a schematic flowchart of a method for obtaining event information on a mobile terminal according to an embodiment of this application.

FIG. 2 is a schematic flowchart of a method for obtaining event information on a mobile terminal according to an embodiment of this application.

S210. A mobile terminal receives an event notification message.

The event notification message is a message of a first application. For example, the first application may be an SMS message APP, WeChat® APP, or QQ® APP, and correspondingly, the event notification message may be an SMS message, a WeChat message, or a QQ message. For example, the event notification message may be a conference notification message, and the conference notification message may include a time, a position, staff, and a phone number (a contact may be included). For another example, the event notification message may be a flight notification message, and the flight notification message may include information such as a time (including a departure time and a landing time), a flight number, a position (including a departure position and a destination).

S220. The mobile terminal obtains n pieces of classifiable information in the event notification message based on a predefined class template according to a preset rule.

For example, a user usually needs to add a plurality of pieces of information such as a contact or a phone number to an address book, and the mobile terminal may define a class template based on class attributes such as a contact, a phone number, an address, and an email address presented in the address book. For example, the mobile terminal may define that the class template includes three class attributes: the contact, the address, and the email address. For another example, the mobile terminal may define that the class template includes four class attributes: the contact, the address, the phone number, and the email address. Then, the mobile terminal obtains the n pieces of classifiable information in the event notification message based on the predefined class template according to the preset rule. The n pieces of classifiable information are respectively corresponding to n class attributes, and n is an integer greater than or equal to 2. For example, when the event notification message is the conference notification message described in S210, then class attributes included in the event notification message include a time, a position, staff, and a phone number. When the class template includes the four class attributes, the mobile terminal may obtain information about the time, the position, the staff, and the phone number information in the event notification message.

It should be understood that in this embodiment of this application, a system may define a class template based on one or more applications. For example, the system may define the class template based on only one application such as an address book or a calendar, or define the class template with reference to a plurality of applications such as an address book and a calendar. This is not limited in this embodiment of this application.

In this embodiment of this application, after obtaining the n pieces of classifiable information in the event notification message, the mobile terminal may present a first operation page to the user, and the first operation page includes at least two of the n pieces of classifiable information. Based on information presented on the first operation page, the user can learn of the classifiable information obtained by the terminal device in S220. In addition, to improve intelligibility, the first operation page may further present identification information used to identify each piece of classifiable information. The identification information may be predefined by the system based on a class template. For example, the identification information may be a text or an image for identifying a class attribute defined in the class template. For example, time information may be identified by using a text "time" or an image with an icon of an alarm clock, and position information may be identified by using a text "position" or an image with an icon of a map. A specific form of the identification information is not limited in this application.

S230. The mobile terminal determines a second application based on the n class attributes according to the preset rule.

The second application includes m class attributes, a set that includes the m class attributes is a subset of a set that includes the n class attributes, and m is an integer greater than or equal to 2 and not greater than n. For example, when the n class attributes include the time, the position, the staff, and the phone number, the m class attributes may include the time, the position, and the staff, or may include the position, the staff, and the phone number.

When determining the second application based on the n class attributes according to the preset rule, the mobile terminal may first determine a target application based on the n class attributes, and the target application includes at least one class attribute in the n class attributes. In other words, the mobile terminal may determine an application as the target application, provided that the application includes one of the n class attributes. If there is only one target application, the mobile terminal determines the target application as the second application. If there are a plurality of target applications, the mobile terminal may determine the second application in the following manners.

Manner 1

The mobile terminal determines, from the target applications, an application that has most attributes in the n class attributes, to serve as the second application.

Specifically, after the mobile terminal determines the target applications, the mobile terminal selects, from the target applications, the application that has most attributes in the n class attributes, and determines the application as the second application. For example, the n class attributes include the time, the position, the staff, and the phone number; the address book includes two class attributes: the staff and the phone number; a note includes four class attributes: the time, the position, the staff, and the phone number; and the calendar includes one attribute: the time. Therefore, the target applications determined by the mobile terminal include the address book, the note, and the calendar. The note includes most class attributes in the target applications, and therefore the mobile terminal may determine the note that includes the foregoing four class attributes, to serve as the second application.

Manner 2

The mobile terminal determines, from the target applications, an application that has highest relevance to the first application, to serve as the second application.

For example, the first application may be an SMS application, and applications related to the first application may be the WeChat® APP, the QQ® APP, an address book, and the like. The mobile terminal may predefine the applications related to the first application, and define relevance of each application to the first application. When defining an application related to the first application, the mobile terminal may define an application that is frequently used by the user recently or an application that is invoked together with the first application by using a shortcut, to serve as the application related to the first application. This is not specifically limited in this embodiment of this application. In this embodiment of this application, the mobile terminal may first obtain the target applications that include the at least one class attribute in the n class attributes, and then find, based on relevance of these applications to the first application, the application that has highest relevance to the first application, to serve as the second application.

Manner 3

The mobile terminal determines, from the target applications, an application used by a user at a time that is proximate to a time at which the first application is used, to serve as the second application.

Specifically, in this embodiment, the mobile terminal first determines a target application that includes at least one class attribute in the n class attributes. If there are a plurality of target applications, the mobile terminal may determine, based on times at which a user uses these applications, an application used at a most recent time that is proximate to a current time, and determine the application as the second application.

For example, the target applications determined by the mobile terminal include the address book, the calendar, and the note, and if most recent times at which the user uses the three applications are respectively one day ago, two days ago, and five days ago, the mobile terminal determines the address book as the second application.

Manner 4

The mobile terminal determines, from the target applications, an application that is most frequently used by a user, to serve as the second application.

After determining the target applications, the mobile terminal obtains, based on a frequency of recently using each of the target applications by the user, the application that is most frequently used by the user, and determines the application as the second application.

For example, the target applications determined by the mobile terminal include the address book, the calendar, and the note, and if frequencies of recently using the three applications by the user, for example, in the last six months or the last three months are respectively 200, 20, and 10, respectively, the mobile terminal determines the address book as the second application.

Manner 5

The mobile terminal determines an application that is randomly selected from the target applications, to serve as the second application.

Herein, the mobile terminal may determine the second application by using a random algorithm. An algorithm or a method used by the mobile terminal for random selection is not limited in this embodiment of this application.

Manner 6

The mobile terminal determines any one of the target applications as the second application.

In other words, the mobile terminal may determine one or more applications that include the at least one class attribute in the n class attributes, to serve as the second application.

If determining a plurality of applications in the target applications as second applications, the mobile terminal may sequentially present application names of the determined second applications to the user based on a quantity of included class attributes in the n class attributes. For example, from top to bottom of a display screen, the mobile terminal may present, in the first row, a name of an application that includes the most class attributes in the n class attributes, present, in the second row, a name of an application that includes the second most class attributes in the n class attributes, and by analogy, present, in the last row, a name of an application that includes the fewest class attributes in the n class attributes. In addition, the mobile terminal may alternatively sequentially present application names of the determined second applications to the user based on relevance to the first application. For example, from top to bottom of a display screen, the mobile terminal may present, in the first row, a name of an application that has the highest relevance to the first application, present, in the second row, a name of an application that has the second highest relevance to the first application, and by analogy, present, in the last row, a name of an application that has the lowest relevance to the first application. Moreover, the mobile terminal may alternatively sequentially present application names of the determined second applications to the user based on an interval between a use time of the user and a current time, or a use frequency of the user in a recent period of time. Certainly, the mobile terminal may randomly sort the second applications to present application names of the second applications to the user.

The user may select any one of the foregoing second applications, and add one or more pieces of classifiable information in the n pieces of classifiable information to a corresponding class attribute in the selected application. The user may select no application from the presented second applications, but add one or more pieces of classifiable information in the n pieces of classifiable information to a corresponding class attribute in each second application together.

It should be understood that for the foregoing plurality of manners of determining the second application by the mobile terminal, the mobile terminal may select one thereof or perform combination, and a specific manner that is to be used may be defined or selected by the user, so as to meet different user requirements.

It should be understood that the mobile terminal determines the second application based on selection from a plurality of applications. For ease of description, the plurality of applications are referred to as third applications below. To be specific, the mobile terminal determines an application that includes at least one class attribute in the n class attributes from the third applications based on the n class attributes, to serve as the second application. The third applications may be defined by the user herein. For example, the user may define that some or all applications built in a mobile terminal system are the third applications. For another example, the user may define that some or all third-party applications installed on the mobile terminal are the third applications. For still another example, the user may define that all applications built in a mobile terminal system and all third-party applications installed on the mobile terminal are the third applications. A quantity of third applications and sources of the third applications are not limited in this application. The third applications may be defined by the system. In other words, the user cannot change definitions of the third applications.

It should be further understood that the foregoing class template may also be defined based on the third application. When the third application is defined by the user, the class template may also change when the user changes the third application. When the third application is defined by the system, the class template is fixed for the user, and only changes with the system. It should be noted that the mobile terminal usually identifies the event notification message after receiving the event notification message. When the identification succeeds, the mobile terminal prompts the user to perform a shortcut operation on some content in the event notification message, by making special marks for the content, for example, underlining the content. However, in this embodiment of this application, the classifiable information obtained in S220 based on the predefined class template may include only the foregoing specially marked content, or may include only content that is not specially marked, or may include the foregoing specially marked content and content that is not specially marked.

S240. The mobile terminal adds m pieces of classifiable information that are in the event notification message and that are respectively corresponding to m class attributes to the m class attributes in the second application. Specifically, after obtaining the n pieces of classifiable information in the event notification message and the second application, the mobile terminal may automatically add the m pieces of classifiable information in the n pieces of classifiable information to the m class attributes in the second application. For example, the user may add the m pieces of classifiable information to the m class attributes in the second application by operating the first operation page, for example, by touching and holding the first operation page.

Therefore, according to the method for obtaining event information on a mobile terminal in this application, the mobile terminal may obtain the plurality of pieces of classifiable information included in the event notification message by using the predefined class template. In addition, the mobile terminal may obtain, according to the preset rule, an application (namely, the second application) that includes class attributes corresponding to at least two pieces of classifiable information in the plurality of pieces of classifiable information. Further, the mobile terminal may automatically add the at least two pieces of classifiable information in the plurality of pieces of classifiable information to the corresponding class attributes in the second application. Therefore, operation complexity of adding all pieces of classifiable information by the user one by one can be reduced, information addition efficiency can be improved, and user experience can be improved.

The method for obtaining event information on a mobile terminal in this embodiment of this application is described below by using an example in which the class template includes four class attributes: a contact, a phone number, a time, and a position with reference to the conference notification message shown in FIG. 1.

After the mobile terminal receives the conference notification message shown in FIG. 1, by using the class template and the conference notification message, the mobile terminal may obtain four pieces of information in the conference notification message: the contact: Ye Min, the phone number: 13800000000, the event: 10 o'clock tomorrow morning, and the position: No. 18, Road A. In this case, the mobile terminal presents the first operation page shown in FIG. 3 to the user. Alternatively, the mobile terminal may determine the second application in any manner in S230 while presenting the first operation page to the user. For example, the mobile terminal may determine the address book as the second application in the manner 3. Then, after the user operates the first operation page shown in FIG. 3, for example, the user touches and holds the first operation page shown in FIG. 3, the mobile terminal may respectively add the contact: Ye Min and the phone number on the first operation page to a contact column and a phone number column in the address book. After the addition is completed, a shortcut operation page generated by the address book is shown in FIG. 4, and the user may perform a shortcut operation on the page, for example, make a call or send an SMS message.

Optionally, after receiving the event notification message, the mobile terminal may present a second operation page to the user. The second operation page includes the event notification message and a second page element used to prompt the user to operate the event notification message. The mobile terminal may obtain the n pieces of classifiable information in the event notification message based on the predefined class template and the operation performed by the user on the second page element.

Figure 5:
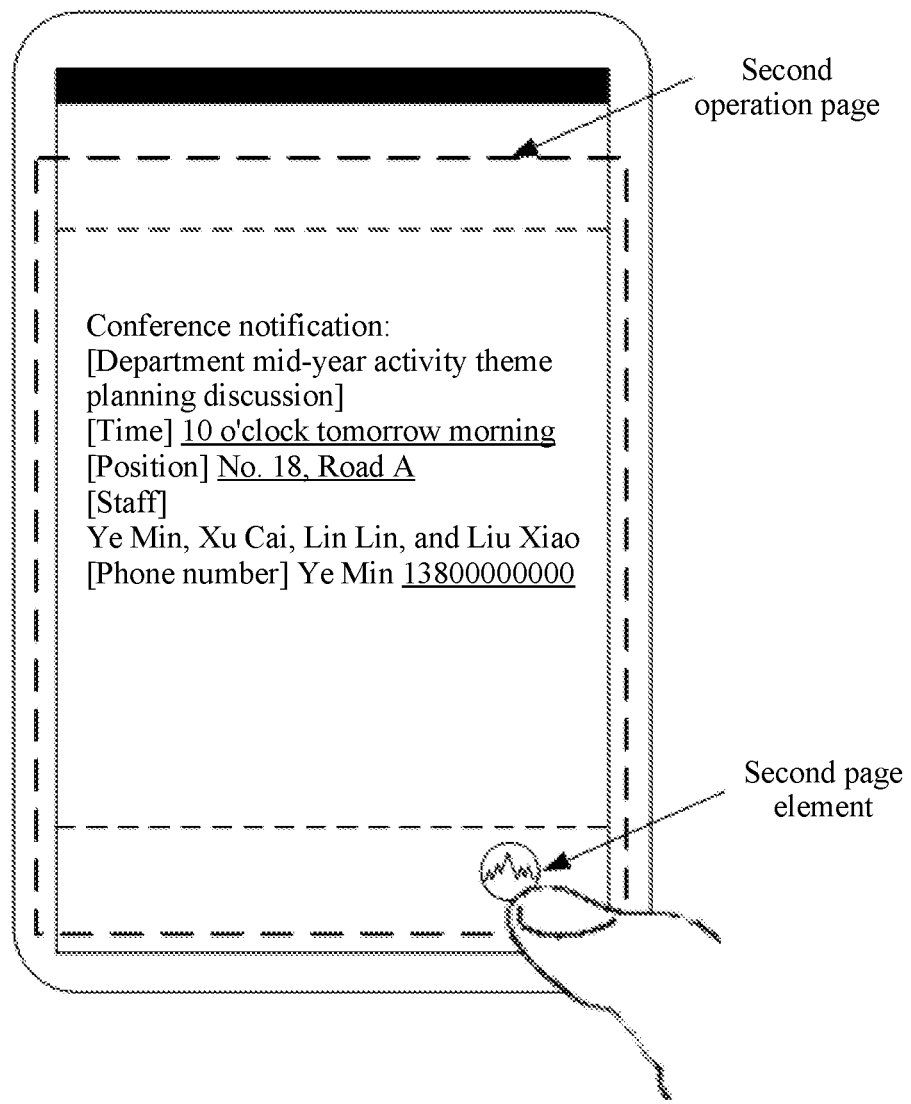
FIG. 5 is a schematic diagram of a method for obtaining event information on a mobile terminal according to another specific embodiment of this application.

Specifically, in an example in which the mobile terminal receives a notification message about a theme of department mid-year activity theme planning discussion, after receiving the notification message, the mobile terminal presents the second operation page shown in FIG. 5. When the user needs to obtain the n pieces of classifiable information in the notification message, the user may obtain the first operation page shown in FIG. 3 or FIG. 6 by operating the second page element, for example, by tapping the second page element. After obtaining the first operation page, the user operates the first operation page presented by the mobile terminal, so that the mobile terminal can add the at least two pieces of classifiable information in the n pieces of classifiable information to the second application.

The first operation page may further include a first page element. The mobile terminal may add the at least two pieces of classifiable information in the n pieces of classifiable information to the second application based on the operation performed by the user on the first page element. The first page element may be a graphic marker. For example, the first page element may be the graphic marker shown in FIG. 6, and the user may add the at least two pieces of classifiable information in the n pieces of classifiable information to the second application by tapping the graphic marker. The first page element may be a marker such as a text for prompting the user to perform an addition operation on the first operation page. A specific form of the first page element is not limited in this application.

Further, if there are a plurality of second applications determined by the mobile terminal, when the mobile terminal adds the at least two pieces of classifiable information in the n pieces of classifiable information to the second application based on the operation performed by the user on the first operation page, the mobile terminal may first present a first operation prompt item based on the operation performed by the user on the first operation page. The first operation prompt item may indicate a target application to which the at least two pieces of classifiable information in the n pieces of classifiable information are added. In other words, the first operation prompt item is used to indicate, to the user, applications to which the at least two pieces of classifiable information in the n pieces of classifiable information may be added. If the user needs to add classifiable information presented on the first operation page to all presented applications, the user may touch and hold the first operation page to add corresponding classifiable information to corresponding class attributes in these applications. In addition, the user may perform selection on the presented applications, and the mobile terminal may add, based on user selection, the at least two pieces of classifiable information in the n pieces of classifiable information to corresponding class attributes in the second application selected by the first user.

Figure 6:
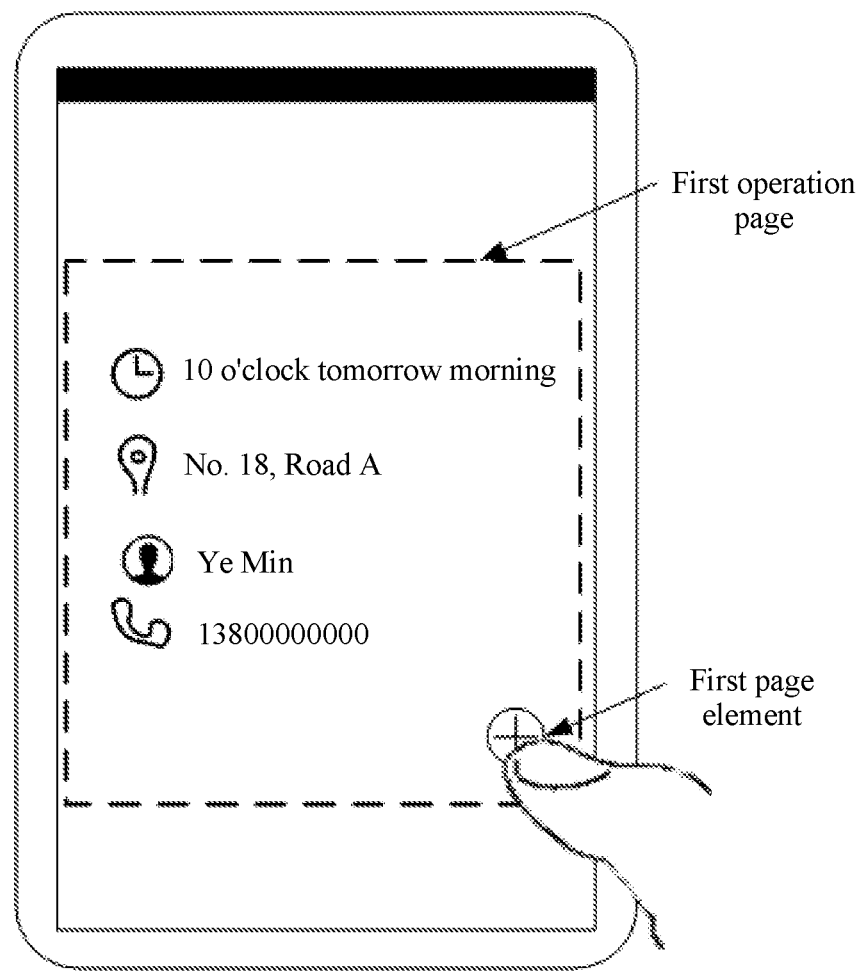
FIG. 6 is a schematic diagram of a method for obtaining event information on a mobile terminal according to another specific embodiment of this application.
Figure 7:
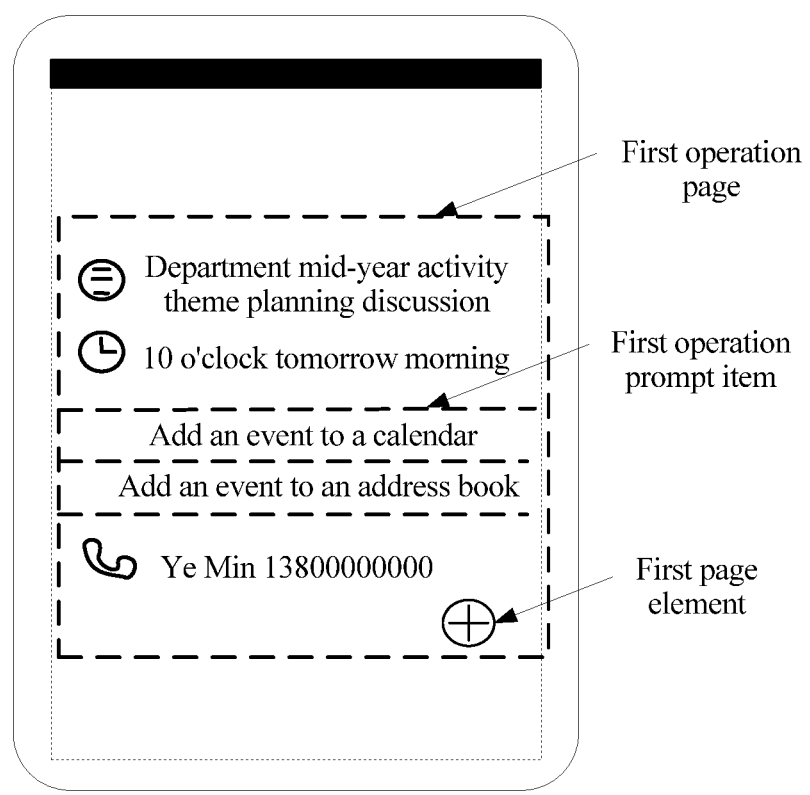
FIG. 7 is a schematic diagram of a method for obtaining event information on a mobile terminal according to another specific embodiment of this application.

For example, after the user operates the first operation page, for example, after the user taps the first page element on the first operation page shown in FIG. 6, the mobile terminal may perform addition processing on the classifiable information presented on the first operation page shown in FIG. 6. When the classifiable information presented on the first operation page may be added to a plurality of applications, a first operation prompt item shown in FIG. 7 may be presented. As shown in FIG. 7, the first operation prompt item includes a prompt item "adding an event to a to-do list" and a prompt item "adding an event to an address book". After the user triggers the first operation prompt item, the mobile terminal may add, to a corresponding class attribute in a corresponding application, the classifiable information presented on the first operation page. For example, after the user triggers the prompt item "adding an event to an address book", the mobile terminal may add the contact and the phone number shown in FIG. 6 to the address book; or after the user triggers the prompt item "adding an event to a to-do list", the mobile terminal may add the four pieces of information shown in FIG. 6 to the to-do list.

In another embodiment of this application, before the mobile terminal adds the m pieces of classifiable information in the event notification message to the m class attributes in the second application, the method may further include:

searching, by the mobile terminal, existing content corresponding to the m class attributes in the second application for content that is the same as the m pieces of classifiable information; and performing, by the mobile terminal, first processing on the same content based on an operation performed by the user on the same information content, where the first processing includes deletion processing.

The deletion processing is performed on the content, in the second application, that is the same as the m pieces of classifiable information, so as to avoid repeated information storage, and release storage space of the mobile terminal. In addition, it is convenient for the user to read and search for related content, so as to improve user experience.

Specifically, the second application may include content related to the n pieces of classifiable information, and the mobile terminal may search m pieces of content corresponding to the m class attributes in the second application for content that is the same as the n pieces of classifiable information. For example, when the second application includes a to-do list application and an address book, the mobile terminal may separately match the n pieces of classifiable information against information content of key words such as a time, an address, a name, and a personal name that are recorded by the user in the to-do list application, and information content of key words such as a contact, a phone number, and an email address in the address book. The content, in the second application, that is related to the n pieces of classifiable information may be obtained by using the foregoing matching operation. For example, if the event notification message is an SMS message, when the SMS message includes two or more text characters that are the same as those of the content in the to-do list or the address book, the matching succeeds. A matching result obtained by the mobile terminal is that the content in the to-do list or the address book includes two or more text characters that are the same as those of each piece of classifiable information. After obtaining the content that is the same as the n pieces of classifiable information, the mobile terminal may indicate, to the user on the first operation page in a form of a second operation prompt item, that the second application includes the content that is the same as the n pieces of classifiable information. By operating the second operation prompt item, the user may perform corresponding processing such as deletion processing on the content, in the second application, that is related to the n pieces of classifiable information.

In addition, in the foregoing matching process, the mobile terminal may also trigger a corresponding Internet resource and service, and other sensor modules of the system such as an acceleration module, a humidity module, and a pulse module for matching. For example, when the event notification message includes an address, the mobile terminal may trigger the corresponding Internet resource and service option such as map opening, route planning, or current situation state identification. For example, through sensor speed obtaining, if it is detected that the user is currently in a driving mode, a route navigation driving mode is pushed by default, or if it is detected that the user is currently in a prohibited state, a taxi application service is pushed.

Therefore, according to the method for obtaining event information on a mobile terminal in this application, when obtaining and identifying the classifiable information, the mobile terminal searches for the content, in the second application, that is the same as the classifiable information, so that before adding the classifiable information in the event notification message to the second application, the user can perform deletion processing on the content, in the second application, that is the same as the classifiable information, thereby improving intelligibility of the content in the second application, and improving user experience.

In this embodiment of this application, when the mobile terminal finds the content that is the same as the n pieces of classifiable information, the mobile terminal may present a prompt item "checking existing content" (namely, an example of the second operation prompt item) on the first operation page.

Figure 3:
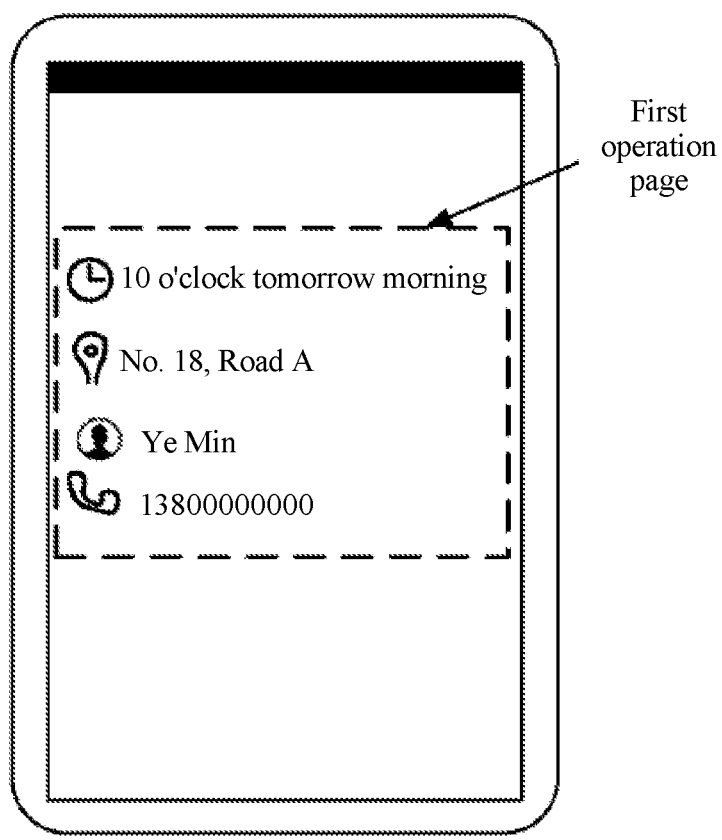
FIG. 3 is a schematic diagram of a method for obtaining event information on a mobile terminal according to a specific embodiment of this application.
Figure 4:
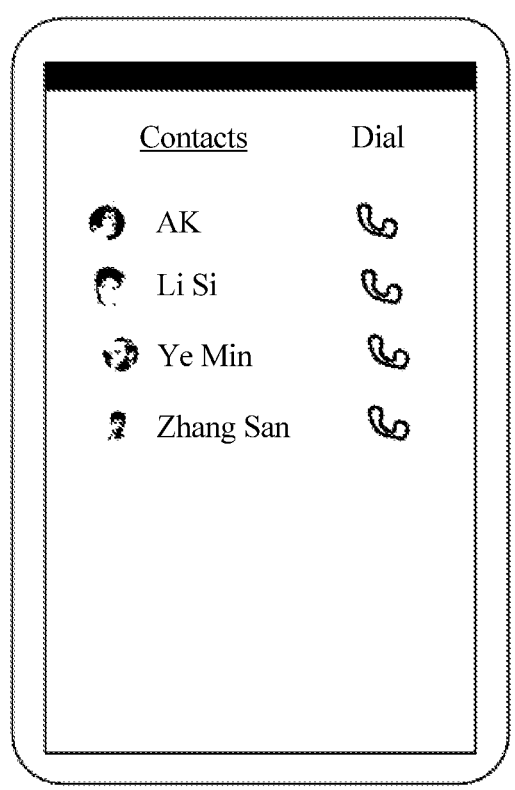
FIG. 4 is a schematic diagram of a method for obtaining event information on a mobile terminal according to a specific embodiment of this application.

For example, with reference to FIG. 1, after receiving the notification message about the theme of department midyear activity theme planning discussion, the mobile terminal obtains the n pieces of classifiable information based on the predefined class template, for example, the content on the first operation page shown in FIG. 3 or FIG. 6. After determining the second application, the mobile terminal searches the second application such as the to-do list or the address book for content that is the same as at least one piece of classifiable information in the n pieces of classifiable information. When finding the content that is the same as at least one piece of classifiable information, the mobile terminal presents a first operation page shown in FIG. 8 to the user.

After the mobile terminal presents the first operation page that includes the second operation prompt item, the user may operate the second operation prompt item, for example, may check, by tapping the second operation prompt item, the content, in the m pieces of content, that is the same as the at least one piece of classifiable information in the n pieces of classifiable information. If the second application includes the content that is the same as the at least one piece of classifiable information in the n pieces of classifiable information, after the user triggers the second operation prompt item, the mobile system presents a second child operation prompt item. The second child operation prompt item indicates the second application in which the content that is the same as the at least one piece of classifiable information in the n pieces of classifiable information is located. By operating the second child operation prompt item, the user can check, in an expected application, the content that is the same as the at least one piece of classifiable information in the n pieces of classifiable information.

Figure 8:
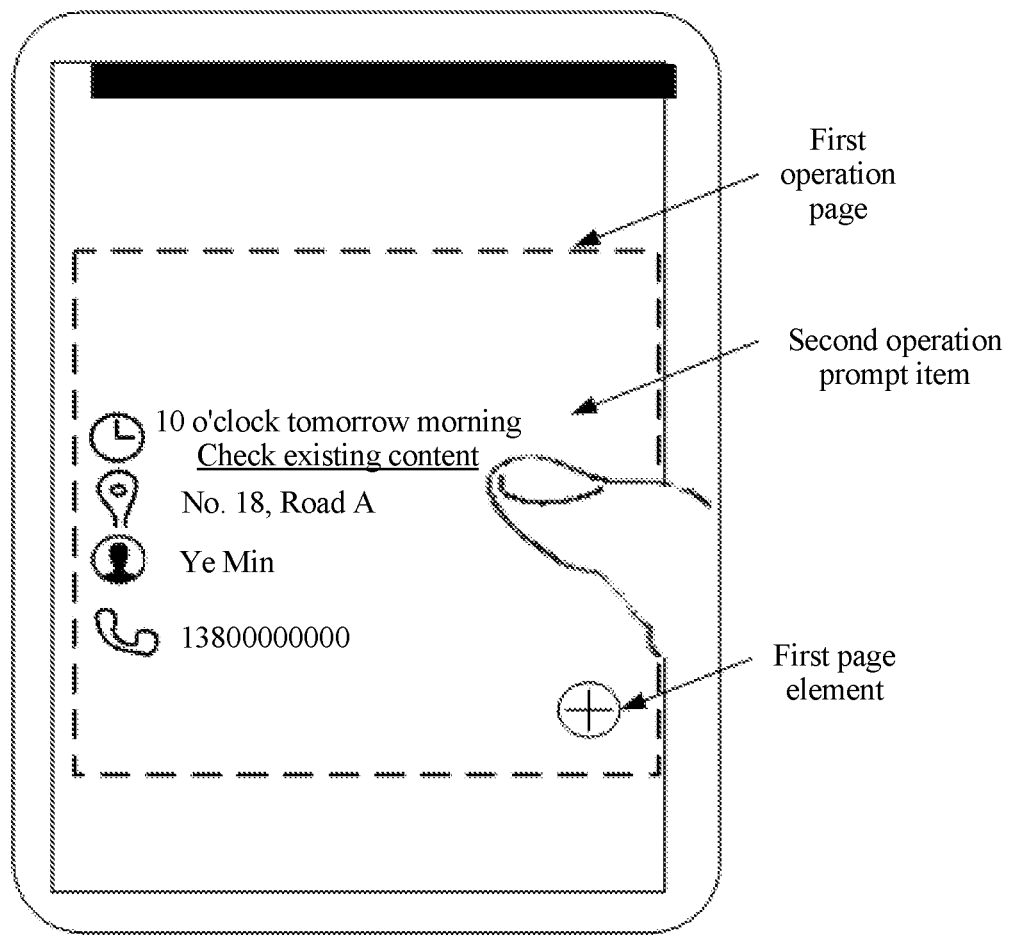
FIG. 8 is a schematic diagram of a method for obtaining event information on a mobile terminal according to still another specific embodiment of this application.
Figure 9:
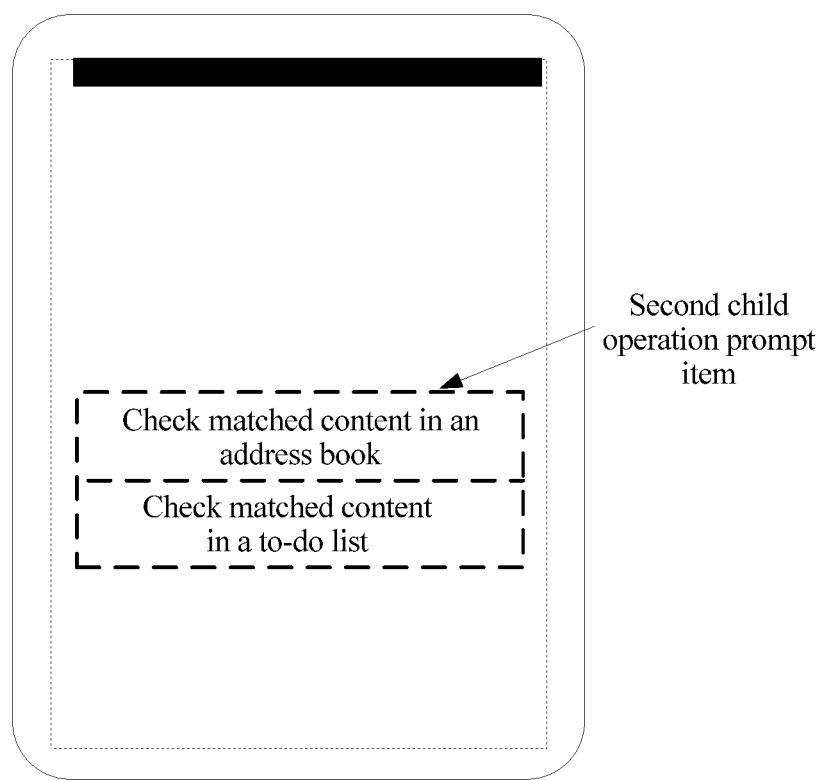
FIG. 9 is a schematic diagram of a method for obtaining event information on a mobile terminal according to still another specific embodiment of this application.

For example, with reference to the first operation page shown in FIG. 8, after the user triggers the prompt item "checking existing content", the mobile terminal presents a second child operation prompt item shown in FIG. 9. The second child operation prompt item includes a prompt item "checking matched content in an address book" and a prompt item "checking matched content in a to-do list". After the user triggers the second child operation prompt item, for example, after the user triggers the prompt item "checking matched content in an address book", the mobile system enables the address book application, and the user may check, in the address book, the content that is the same as the at least one piece of classifiable information in the n pieces of classifiable information.

Optionally, after the user operates the first operation page, the mobile terminal may present a third operation prompt item based on the operation performed by the user on the first operation page. The third operation prompt item prompts the user to perform first processing on the content, in the second application, that is the same as the at least one piece of classifiable information in the n pieces of classifiable information. The user operates the third operation prompt item, so that the mobile terminal can perform first processing on the content, in the second application, that is the same as the at least one piece of classifiable information in the n pieces of classifiable information.

Optionally, the first processing operation includes an event reminding cancel operation and a deletion operation, or an event reminding cancel operation or a deletion operation.

Figure 10:
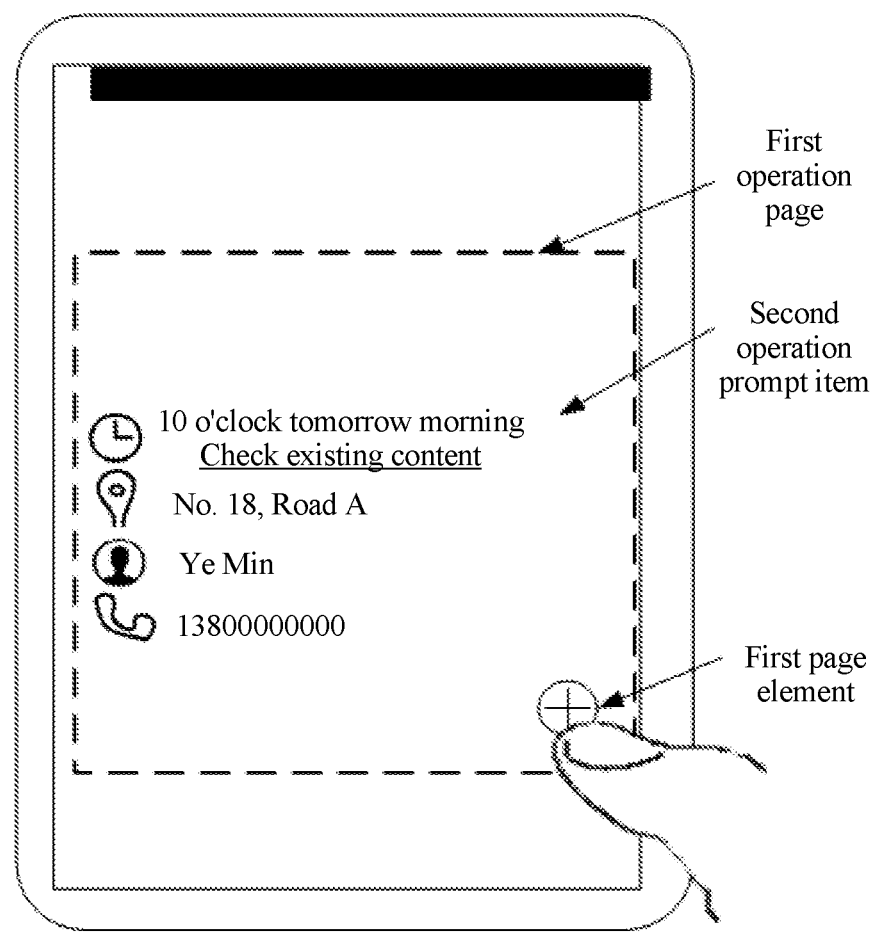
FIG. 10 is a schematic diagram of a method for obtaining event information on a mobile terminal according to another specific embodiment of this application.
Figure 11:
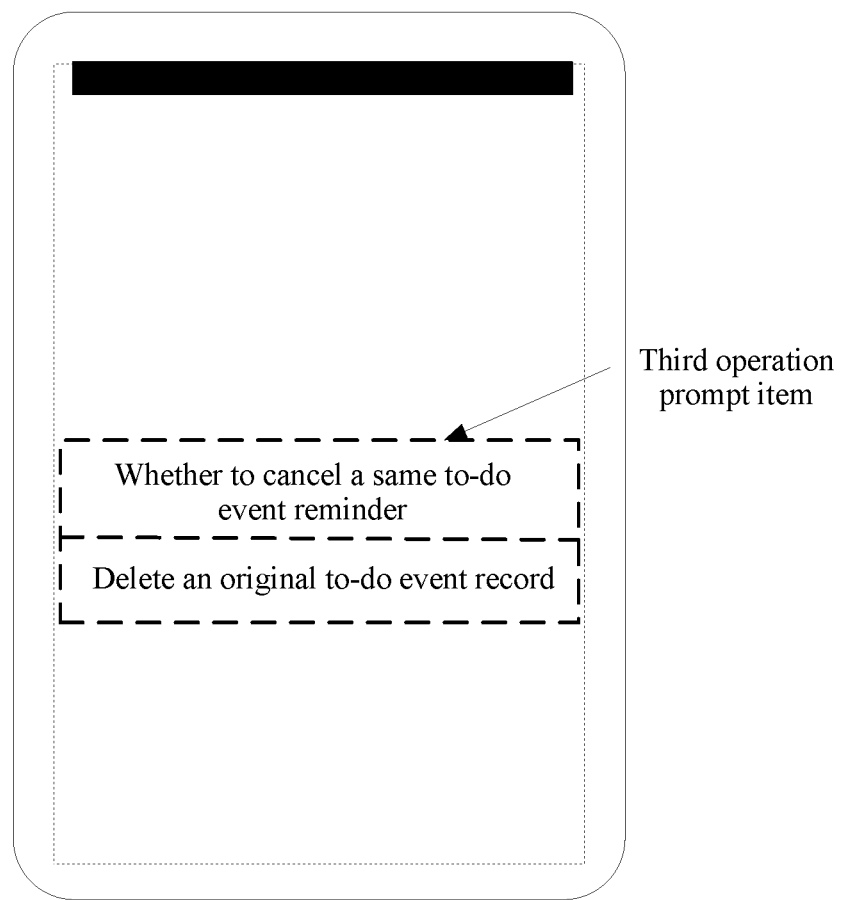
FIG. 11 is a schematic diagram of a method for obtaining event information on a mobile terminal according to another specific embodiment of this application.

For example, as shown in FIG. 10, after the user operates the first page element on the first operation page, the mobile terminal may present a third operation prompt item shown in FIG. 11 to the user. As shown in FIG. 11, the third operation prompt item includes a prompt item "whether to cancel a same to-do event reminder" and a prompt item "deleting an original to-do event record". After the user triggers the prompt item shown in FIG. 11, the mobile terminal performs processing corresponding to the prompt item triggered by the user. For example, after the user triggers the prompt item "whether to cancel a same to-do event reminder", the mobile terminal system cancels a reminder of an event related to No. 18, Road A, 10 o'clock tomorrow morning, or Ye Min.

The deletion processing is performed on the content, in the second application, that is the same as the m pieces of classifiable information, so as to avoid repeated information storage, and release storage space of the mobile terminal. In addition, it is convenient for the user to read and search for related content, so as to improve user experience.

Figure 12:
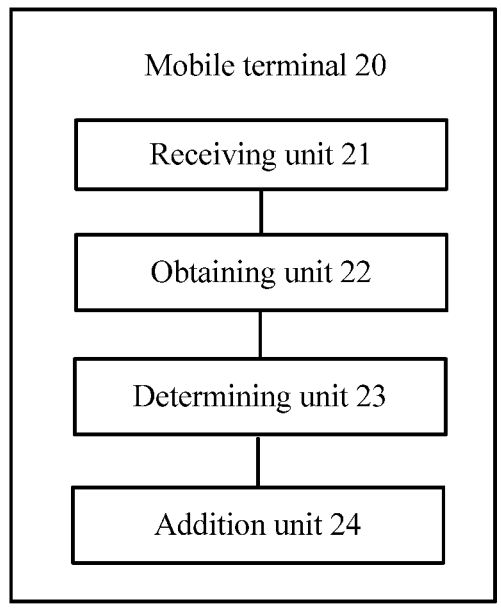
FIG. 12 is a schematic block diagram of a mobile terminal according to an embodiment of this application.

The candidate item presentation method according to the embodiments of this application are described in detail above with reference to FIG. 2 to FIG. 11, and the following describes in detail a mobile terminal according to the embodiments of this application with reference to FIG. 12.

FIG. 12 is a schematic block diagram of a mobile terminal 20 according to an embodiment of this application. As shown in FIG. 12, the mobile terminal 20 includes a receiving unit 21, an obtaining unit 22, a determining unit 23, and an addition unit 24.

The receiving unit 21 is configured to receive an event notification message of a first application.

The obtaining unit 22 is configured to obtain n pieces of classifiable information in the event notification message based on a predefined class template. The n pieces of classifiable information are respectively corresponding to n class attributes, the class template includes a classification relationship between classifiable information and a class attribute, and n is an integer greater than or equal to 2.

The determining unit 23 is configured to determine a second application based on the n class attributes according to a preset rule. The second application includes m class attributes, a set that includes the m class attributes is a subset of a set that includes the n class attributes, and m is an integer greater than or equal to 2 and not greater than n.

The addition unit 24 is configured to add m pieces of classifiable information that are in the event notification message and that are respectively corresponding to the m class attributes to the m class attributes in the second application.

In embodiments of this application, the mobile terminal may obtain a plurality of pieces of classifiable information included in the event notification message by using the predefined class template. In addition, the mobile terminal may obtain, according to the preset rule, an application (namely, the second application) that includes class attributes corresponding to at least two pieces of classifiable information in the plurality of pieces of classifiable information. Further, the mobile terminal may automatically add the at least two pieces of classifiable information in the plurality of pieces of classifiable information to the corresponding class attributes in the second application. Therefore, operation complexity of adding all pieces of classifiable information by a user one by one can be reduced, information addition efficiency can be improved, and user experience can be improved.

It should be understood that the mobile terminal 20 may be configured to perform procedures and/or steps in the method shown in FIG. 2. To avoid repetition, details are not described herein again.

It should be further understood that the mobile terminal 20 herein is implemented in a form of a function module. The term "unit" herein may be an application-specific integrated circuit (ASIC), an electronic circuit, a processor (for example, a shared processor, a dedicated processor, or a packet processor) configured to execute one or more software or firmware programs, a memory, a combined logic circuit, and/or another proper component for supporting the described functions.

Figure 13:
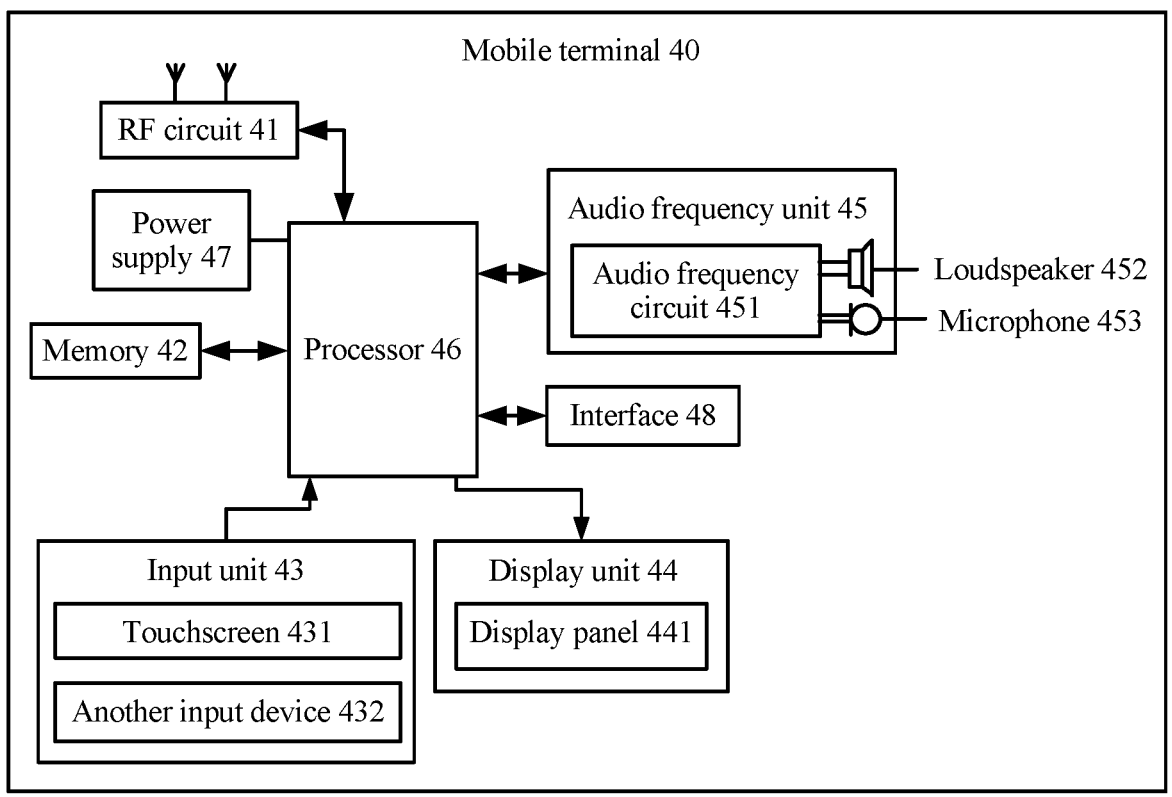
FIG. 13 is a schematic block diagram of a mobile terminal according to another embodiment of this application.

As shown in FIG. 13, an embodiment of this application further provides a mobile terminal 40. As shown in FIG. 13, the mobile terminal 40 may specifically include components such as a radio frequency (RF) circuit 41, a memory 42, an input unit 43, a display unit 44, an audio frequency unit 45, a processor 46, a power supply 47, and an interface 48. A person skilled in the art may understand that a structure of the mobile terminal shown in FIG. 13 does not constitute a limitation on the mobile terminal. The mobile terminal may specifically include more or fewer components than those shown in FIG. 13, or combine some components, or have different component arrangements.

The radio frequency circuit 41 is configured to receive an event notification message of a first application. The processor 46 is configured to: obtain n pieces of classifiable information in the event notification message based on a predefined class template, where the n pieces of classifiable information are respectively corresponding to n class attributes, the class template includes a classification relationship between classifiable information and a class attribute, and n is an integer greater than or equal to 2; determine a second application based on the n class attributes according to a preset rule, where the second application includes m class attributes, a set that includes the m class attributes is a subset of a set that includes the n class attributes, and m is an integer greater than or equal to 2 and not greater than n; and add m pieces of classifiable information that are in the event notification message and that are respectively corresponding to the m class attributes to the m class attributes in the second application.

Therefore, in this application, the mobile terminal may obtain a plurality of pieces of classifiable information included in the event notification message by using the predefined class template. In addition, the mobile terminal may obtain, according to the preset rule, an application (namely, the second application) that includes class attributes corresponding to one or more pieces of classifiable information in the plurality of pieces of classifiable information. Further, the mobile terminal may automatically add the one or more pieces of information in the plurality of pieces of classifiable information to the corresponding class attributes in the second application. Therefore, operation complexity of adding all pieces of classifiable information by a user one by one can be reduced, information addition efficiency can be improved, and user experience can be improved.

It should be understood that in this embodiment of this application, the RF circuit 41 may be configured to receive and send a signal in an information receiving and sending process or in a call process. Particularly, after receiving a downlink signal, the RF circuit 41 sends the downlink signal to the processor 46 for processing, and sends an uplink signal. The RF circuit usually includes but is not limited to an antenna, at least one amplifier, a transceiver, a coupler, a low noise amplifier (LNA), a duplexer, and the like. In addition, the RF circuit 41 may further communicate with a network and another device through wireless communication. The wireless communication may use any communications standard or protocol that includes but is not limited to a Global system for mobile communications (GSM), a general packet radio service (GPRS), Code Division Multiple Access (CDMA), Wideband Code Division Multiple Access (WCDMA), Long Term Evolution (LTE), an email, a short messaging service (SMS), and the like.

The memory 42 may be configured to store a software program and a module. The processor 46 performs various function applications of the mobile terminal and signal processing by running the software program and the module that are stored in the memory 42. The memory 42 may mainly include a program storage area and a data storage area. The program storage area may store an operating system of a smartphone, an application required by at least one function (for example, an application required by an information input function, namely, an input method application, a sound playing function, or an image playing function), and the like. The data storage area may store data (for example, a lexicon created when the user uses an input method, audio data, image data, or a phone book) created when the smartphone is used and the like. In addition, the memory 42 may include a high-speed random access memory, or may include a nonvolatile memory such as at least one magnetic disk storage device, a flash memory, or another volatile solid-state storage device.

The input unit 43 may be configured to: receive entered digit or character information, and generate key signal input related to user setting and function control of the mobile terminal. Specifically, the input unit 43 may include a touchscreen 431 and another input device 432. The touchscreen 431 is also referred to as a touch panel, and may collect a touch operation (for example, an operation performed by a user on or near the touchscreen 431 by using any proper object or accessory such as a finger or a stylus) performed by the user on or near the touchscreen 431, and drive a corresponding connection apparatus by using a preset program. Optionally, the touchscreen 431 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into contact coordinates, sends the contact coordinates to the processor 46, and receives and executes a command sent by the processor 46. In addition, the touchscreen 431 may be implemented by using a plurality of types such as a resistive type, a capacitive type, an infrared type, and a surface acoustic wave type. Another input device 432 may include but is not limited to one or more of a physical keyboard, a function key (such as a volume control key or a power supply key), a trackball, a mouse, a joystick, and the like.

The display 44 may be configured to display various menus of the mobile terminal, and information entered by a user or information provided for a user. The display unit 44 may include a display panel 441. Optionally, the display panel 441 may be configured in a form such as a liquid crystal display (LCD) or an organic light-emitting diode (OLED). Further, the touchscreen 431 may cover the display panel 441. After detecting a touch operation on or near the touchscreen 431, the touchscreen 431 transmits the touch operation to the processor 46 to determine a type of a touch event. Then, the processor 46 provides corresponding visual output on the display panel 441 based on the type of the touch event. Although the touchscreen 431 and the display panel 441 are used as two independent components to implement input and output functions of the smartphone in FIG. 13, in some embodiments, the touchscreen 431 and the display panel 441 may be integrated to implement the input and output functions of the mobile terminal.

The audio frequency unit 45 includes an audio frequency circuit 451, a loudspeaker 452, and a microphone 453. The audio frequency unit 45 may provide an audio interface between the user and the mobile terminal. The audio frequency circuit 451 may convert received audio data into an electrical signal and transmit the electrical signal to the loudspeaker 452, and the loudspeaker 452 converts the electrical signal into a sound signal and outputs the sound signal. In addition, the microphone 453 converts a collected sound signal into an electrical signal, and the audio frequency circuit 451 receives the electrical signal, converts the electrical signal into audio data, and outputs the audio data to the RF circuit 41 to send the audio data to, for example, another mobile terminal, or outputs the audio data to the memory 42 for further processing.

The processor 46 is a control center of the mobile terminal, connects to all part of the entire mobile terminal by using various interfaces and lines, and implements various functions of the mobile terminal and data processing by running or executing a software program and a module stored in the memory 42 and by invoking data stored in the memory 42, to implement corresponding functions of the mobile terminal. Optionally, the processor 46 may include one or more processing units. Optionally, an application processor and a modem processor may be integrated into the processor 46, the application processor mainly processes an operating system, a user interface, an application, and the like, and the modem processor mainly processes wireless communication. It can be understood that the foregoing modem processor may not be integrated into the processor 46.

The mobile terminal further includes the power supply 47 (such as a battery) that supplies power to the components. Preferably, the power supply may be logically connected to the processor 46 by using a power management system, so as to implement functions such as charging and discharging management and power consumption management by using the power management system.

The interface 48 may be configured to: connected to other devices, and transmit data between the mobile terminal and other devices.

Optionally, the mobile terminal may further include a Wireless Fidelity (Wi-Fi) module, a Bluetooth module, and the like that are not shown in FIG. 13. Details are not described in this embodiment of this application.

It should be understood that the mobile terminal 40 in this embodiment of this application may be corresponding to the mobile terminal 20 in the embodiment of this application, and may be corresponding to the mobile terminal in the method embodiment of this application. For brevity, details are not described herein again.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments by using any appropriate manner.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

Methods or steps described in the embodiments disclosed in this specification may be implemented by hardware, a software program executed by a processor, or a combination thereof. The software program may be set in a random access memory (RAM), a memory, a read-only memory (ROM), an electrically programmable read-only memory (EPROM), an electrically erasable programmable read-only memory (EEPROM), a register, a hard disk, a removable disk, a compact disc read-only memory (CD-ROM), or any other form of storage medium known in the art.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed.

The units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit.

This application is described in detail with reference to the accompanying drawings and in combination with the example embodiments, but this application is not limited thereto. Various equivalent modifications or replacements can be made to the embodiments of this application by a person of ordinary skill in the art without departing from the spirit and essence of this application, and the modifications or replacements shall fall within the scope of this application.

What is claimed is:

1. A method, comprising:
  receiving, by a mobile terminal, an event notification message of a first application;
  obtaining, by the mobile terminal, n pieces of classifiable information in the event notification message based on a predefined class template, wherein the n pieces of classifiable information correspond to n class attributes, the predefined class template comprises a classification relationship between classifiable information and a particular class attribute, and n is an integer greater than 2;
  determining a plurality of target applications of the mobile terminal based on then class attributes, wherein each target application of the plurality of target applications comprises at least one class attribute in then class attributes;
  determining, by the mobile terminal, a second application from the plurality of target applications according to a preset rule, wherein the second application comprises m class attributes, a set that comprises them class attributes is a subset of a set that comprises then class attributes, and m is an integer greater than or equal to 2 and less than n; and
  adding, by the mobile terminal, m pieces of classifiable information that are in the event notification message to them class attributes in the second application, wherein them pieces of classifiable information correspond to them class attributes in the second application
  wherein the determining, by the mobile terminal, a second application from the plurality of target applications according to a preset rule comprises:
  determining, by the mobile terminal from the plurality of target applications, a particular application that comprises the greatest number of attributes in then class attributes, to serve as the second application.

2. The method according to claim 1, wherein before the adding, by the mobile terminal, m pieces of classifiable information in the event notification message to the m class attributes in the second application, the method further comprises:
  searching, by the mobile terminal, existing content in the second application for similar content that includes the m pieces of classifiable information; and
  performing, by the mobile terminal, first processing on the similar content based on an operation performed by the user on the similar content, wherein the first processing comprises deletion processing.

3. A mobile terminal, comprising a transceiver, a processor, and a memory, wherein the memory is configured to store at least one instruction, and the processor is configured to invoke the at least one instruction to perform the following processing:
  receiving, from the transceiver, an event notification message of a first application;
  obtaining n pieces of classifiable information in the event notification message based on a predefined class template, wherein the n pieces of classifiable information correspond to n class attributes, the predefined class template comprises a classification relationship between classifiable information and a class attribute, and n is an integer greater than 2;
  determining a plurality of target applications of the mobile terminal based on then class attributes, wherein each target application of the plurality of target applications comprises at least one class attribute in then class attributes;
  determining a second application from the plurality of target applications according to a preset rule, wherein the second application comprises m class attributes, a set that comprises them class attributes is a subset of a set that comprises then class attributes, and m is an integer greater than or equal to 2 and less than n; and adding m pieces of classifiable information that are in the event notification message to them class attributes in the second application, wherein them pieces of classifiable information correspond to them class attributes in the second application wherein the determining, by the mobile terminal, a second application from the plurality of target applications according to a preset rule comprises:

determining, by the mobile terminal from the plurality of target applications, a particular application that comprises the greatest number of attributes in then class attributes, to serve as the second application.

4. The mobile terminal according to claim 3, wherein the processor is further configured to search existing content in the second application for similar content that includes the m pieces of classifiable information; and perform first processing on the similar content based on an operation performed by the user on the similar content, wherein the first processing comprises deletion processing.

5. A non-transitory computer-readable storage medium comprising instructions that, when executed by a processor, cause the processor to carry out the following operations:

receiving, by a mobile terminal, an event notification message of a first application;

obtaining, by the mobile terminal, n pieces of classifiable information in the event notification message based on a predefined class template, wherein the n pieces of classifiable information correspond to n class attributes, the predefined class template comprises a classification relationship between classifiable information and a particular class attribute, and n is an integer greater than 2;

determining a plurality of target applications of the mobile terminal based on then class attributes, wherein each target application of the plurality of target applications comprises at least one class attribute in then class attributes;

determining, by the mobile terminal, a second application from the plurality of target applications according to a preset rule, wherein the second application comprises m class attributes, a set that comprises them class attributes is a subset of a set that comprises then class attributes, and m is an integer greater than or equal to 2 and less than n; and adding, by the mobile terminal, m pieces of classifiable information that are in the event notification message to them class attributes in the second application, wherein them pieces of classifiable information correspond to them class attributes in the second application wherein the determining, by the mobile terminal, a second application from the plurality of target applications according to a preset rule comprises:

determining, by the mobile terminal from the plurality of target applications, a particular application that comprises the greatest number of attributes in then class attributes, to serve as the second application.

* * * * *

UNITED STATES PATENT AND TRADEMARK OFFICE
CERTIFICATE OF CORRECTION

Page 1 of 2

PATENT NO. : 10,827,055 B2
APPLICATION NO. : 16/456951
DATED : November 3, 2020
INVENTOR(S) : Ye et al.

It is certified that error appears in the above-identified patent and that said Letters Patent is hereby corrected as shown below:

In the Claims

Claim 1: Column 20, Line 14: "mobile terminal based on then class attributes, wherein" should read -- mobile terminal based on the n class attributes, wherein --.

Claim 1: Column 20, Line 16: "cations comprises at least one class attribute in then" should read -- cations comprises at least one class attribute in the n --.

Claim 1: Column 20, Lines 21-22: "m class attributes, a set that comprises them class attributes is a subset of a set that comprises then class" should read -- m class attributes, a set that comprises the m class attributes is a subset of a set that comprises the n class --.

Claim 1: Column 20, Lines 27-29: "them class attributes in the second application, wherein them pieces of classifiable information correspond to them class attributes in the second application" should read -- the m class attributes in the second application, wherein the m pieces of classifiable information correspond to the m class attributes in the second application --.

Claim 1: Column 20, Line 35: "prises the greatest number of attributes in then class" should read -- prises the greatest number of attributes in the n class --.

Claim 3: Column 20, Line 62: "mobile terminal based on then class attributes, wherein" should read -- mobile terminal based on the n class attributes, wherein --.

Claim 3: Column 20, Line 64: "cations comprises at least one class attribute in then" should read -- cations comprises at least one class attribute in the n --.

Claim 3: Column 21, Lines 2-3: "set that comprises them class attributes is a subset of a set that comprises then class attributes, and m is an" should read -- set that comprises the m class attributes is a subset of a set that comprises the n class attributes, and m is an --.

Signed and Sealed this
Twenty-sixth Day of April, 2022

Katherine Kelly Vidal
*Director of the United States Patent and Trademark Office*

Claim 3: Column 21, Lines 6-8: "event notification message to them class attributes in the second application, wherein them pieces of classifiable information correspond to them class attributes in" should read -- event notification message to the m class attributes in the second application, wherein the m pieces of classifiable information correspond to the m class attributes in --.

Claim 3: Column 21, Line 15: "prises the greatest number of attributes in then class" should read -- prises the greatest number of attributes in the n class --.

Claim 5: Column 22, Line 8: "mobile terminal based on then class attributes, wherein" should read -- mobile terminal based on the n class attributes, wherein --.

Claim 5: Column 22, Line 10: "cations comprises at least one class attribute in then" should read -- cations comprises at least one class attribute in the n --.

Claim 5: Column 22, Lines 15-16: "m class attributes, a set that comprises them class attributes is a subset of a set that comprises then class" should read -- m class attributes, a set that comprises the m class attributes is a subset of a set that comprises the n class --.

Claim 5: Column 22, Lines 21-23: "them class attributes in the second application, wherein them pieces of classifiable information correspond to them class attributes in the second application" should read -- the m class attributes in the second application, wherein the m pieces of classifiable information correspond to the m class attributes in the second application --.

Claim 5: Column 22, Line 29: "prises the greatest number of attributes in then class" should read -- prises the greatest number of attributes in the n class --.